(12) United States Patent
Trawick et al.

(10) Patent No.: US 12,328,086 B2
(45) Date of Patent: Jun. 10, 2025

(54) AIRCRAFT WITH ENGINE-DRIVEN PERMANENT MAGNET GENERATOR

(71) Applicant: Rolls-Royce Corporation, Indianapolis, IN (US)

(72) Inventors: David R. Trawick, Indianapolis, IN (US); Matthew Hill, Avon, IN (US); Chandana J. Gajanayake, Singapore (SG)

(73) Assignee: Rolls-Royce Corporation, Indianapolis, IN (US)

( * ) Notice: Subject to any disclaimer, the term of this patent is extended or adjusted under 35 U.S.C. 154(b) by 469 days.

(21) Appl. No.: 17/827,188

(22) Filed: May 27, 2022

(65) Prior Publication Data

US 2024/0007025 A1 Jan. 4, 2024

(51) Int. Cl.

| | |
|---|---|
| *H02P 3/06* | (2006.01) |
| *B64D 31/18* | (2024.01) |
| *B64D 35/024* | (2025.01) |
| *B64D 35/025* | (2025.01) |
| *F01D 21/04* | (2006.01) |
| *H02K 1/12* | (2006.01) |
| *H02K 1/27* | (2022.01) |
| *H02K 7/00* | (2006.01) |
| *H02K 11/33* | (2016.01) |
| *H02P 9/00* | (2006.01) |
| *H02P 9/06* | (2006.01) |

(52) U.S. Cl.
CPC ............... *H02P 3/06* (2013.01); *B64D 31/18* (2024.01); *B64D 35/024* (2024.01); *B64D 35/025* (2024.01); *F01D 21/045* (2013.01); *H02K 1/12* (2013.01); *H02K 1/27* (2013.01); *H02K 7/003* (2013.01); *H02K 7/006* (2013.01); *H02K 11/33* (2016.01); *H02P 9/006* (2013.01); *H02P 9/06* (2013.01)

(58) Field of Classification Search
CPC .... H02P 3/06; H02P 9/02; H02P 9/006; H02P 9/06; H02P 2101/30; H02K 1/12; H02K 1/27; H02K 7/003; H02K 7/006; H02K 7/1823; H02K 11/33; B64D 31/00; B64D 31/18; B64D 35/024; B64D 35/025; B64D 35/08; B64D 27/026; B64D 27/10; B64D 27/33; B64D 45/00; F01D 21/045; F16D 9/08
See application file for complete search history.

(56) References Cited

U.S. PATENT DOCUMENTS

| | | | |
|---|---|---|---|
| 7,173,399 B2 | 2/2007 | Sihler et al. | |
| 8,907,512 B2 | 12/2014 | Kuczaj | |
| 9,729,096 B2 | 8/2017 | Edwards | |
| 10,125,692 B2 | 11/2018 | Ernst | |
| 10,837,304 B2 | 11/2020 | Vondrell et al. | |
| 11,085,377 B2* | 8/2021 | Rodrigues | F02C 7/32 |
| 11,236,678 B2 | 2/2022 | Davies | |
| 2009/0230927 A1* | 9/2009 | Patterson | H02P 9/02 322/12 |

(Continued)

*Primary Examiner* — Jason H Duger
(74) *Attorney, Agent, or Firm* — Barnes & Thornburg

(57) ABSTRACT

An aircraft includes an internal combustion engine and an electrical power system. The electrical power system includes a permanent magnet machine and an inverter coupled to the permanent magnet machine. The permanent magnet machine includes a stator and a rotor configured to rotate relative to the stator.

20 Claims, 6 Drawing Sheets

(56) References Cited

U.S. PATENT DOCUMENTS

| | | |
|---|---|---|
| 2012/0201657 A1 | 8/2012 | Donnelly et al. |
| 2019/0170068 A1* | 6/2019 | Darby .................... F01D 21/06 |
| 2020/0083831 A1* | 3/2020 | Rozman .................. H02M 7/10 |
| 2021/0075292 A1* | 3/2021 | Finke ...................... F16D 11/16 |
| 2021/0079850 A1* | 3/2021 | Davies .................... F02C 7/36 |

* cited by examiner

AIRCRAFT WITH ENGINE-DRIVEN PERMANENT MAGNET GENERATOR

FIELD OF THE DISCLOSURE

The present disclosure relates generally to aircraft, and more specifically to aircraft with engine-driven permanent magnet generators for the production of electrical energy.

BACKGROUND

Interest in onboard electrical energy generation in vehicles continues to be a trend as other onboard systems require electrical energy during operation. In some aircraft and other weight-sensitive applications, permanent magnet generators are integrated for various reasons of efficiency and/or power needs.

Permanent magnets included in permanent magnet generators cannot be switched off, and will continue to create a moving magnetic field as long as the machine is rotating. This rotation continues even if there is a short circuit in the stator windings, which can threaten the system with overheating. Some solutions to this potential problem include heavy brakes or clutches to manage rotation in the event of such a short circuit. There is a need for further refined and light-weight solutions to manage rotation of permanent magnet generator rotors in the event of a short circuit or other fault in the system.

SUMMARY

The present disclosure may comprise one or more of the following features and combinations thereof.

An electrified aircraft may include an internal combustion engine, an electrical power system, a shaft, and a controller. The electrical power system may include an permanent magnet machine and an inverter coupled to the permanent magnet machine. The permanent magnet machine may include a stator and a rotor configured to rotate relative to the stator to move a plurality of permanent magnets past a plurality of coils. The shaft may be coupled to the rotor of the permanent magnet machine to carry rotation from the internal combustion engine to the permanent magnet machine to drive rotation of the rotor. The controller may be coupled to the inverter.

In some embodiments, the shaft may have a predetermined failure frequency that is different from normal operating frequencies of the shaft. The controller may be configured to direct the inverter to induce a preselected torque transient in the shaft to excite the shaft at the predetermined failure frequency. The controller may direct the inverter to induce the preselected torque transient to selectively cause shaft failure in response to indicators of a fault in the permanent magnet machine. In this way, the rotor of the permanent magnet machine may be mechanically decoupled from the internal combustion engine and stops rotation thereby avoiding generation of undesired power profiles and/or excess heat.

In some embodiments, the shaft includes an input portion coupled to the internal combustion engine, an output portion coupled to the permanent magnet machine, and a shaft retention assembly. The shaft retention assembly may be coupled to the input portion and the output portion to support the input and the output portions of the shaft upon induced shaft failure. The shaft retention assembly may support the input and output portion so that the input portion and the output portion are allowed to rotate relative to one another after the shaft failure.

In some embodiments, the shaft retention assembly may include plurality of bearings and a sleeve. The plurality of bearings may be spaced apart relative to each other along the shaft to support the input portion and the output portion of the shaft. The sleeve may be arranged around the plurality of bearings and the shaft to contain any loose shaft pieces after shaft failure.

In some embodiments, the shaft retention assembly may include a retainer ring. The retainer ring may have an input end arranged around the input portion of the shaft and an output end arranged around the output portion of the shaft to maintain non-rotational coupling of the input portion with the output portion.

In some embodiments, one of the input end and the output end of the retainer ring may be fixed to one of the input portion and the output portion of the shaft to couple the retainer ring for rotation therewith. The other of the input end and the output end may be free to rotate relative to the other of the input portion and the output portion of the shaft.

In some embodiments, the shaft may further include a narrow neck located between the input portion and the output portion of the shaft. The narrow neck may provide a preselected fracture feature configured to fracture at the predetermined failure frequency in response to the preselected torque transient from the inverter. The preselected fracture feature may fracture to mechanically decouple the permanent magnet machine from the internal combustion engine. In some embodiments, the retainer ring may be arranged around the preselected fracture feature included in the shaft.

In some embodiments, the shaft retention assembly may include a tie bolt. The tie bolt may be arranged to extend through the shaft to maintain non-rotational coupling of the input portion with the output portion.

In some embodiments, the controller may be configured to receive a signal indicative of a fault condition in the permanent magnet machine. The controller may be configured to direct the inverter to induce shaft failure in response to receiving the signal indicative of the fault condition in the permanent magnet machine.

In some embodiments, the fault condition in the permanent magnet machine may include at least one of a turn to turn fault, a phase to phase fault, and a phase to ground fault. In some embodiments, the fault condition in the permanent magnet machine may be a turn to turn fault. In some embodiments, the fault condition in the permanent magnet machine may be a phase to phase fault. In some embodiments, the fault condition in the permanent magnet machine may be a phase to ground fault.

In some embodiments, the controller may be configured to receive a signal indicative of shaft failure after the inverter is directed to induce shaft failure to confirm the shaft has fractured in response to the preselected torque transient from the inverter. In some embodiments, the controller may be configured to direct the inverter to operate the permanent magnet machine to in a motor-disabled mode in response to receiving the signal indicative of shaft failure.

In some embodiments, the controller may include an accelerometer sensor. The sensor may be coupled to bearings that support the shaft. The sensor may be configured to measure vibration of the bearings. The signal indicative of shaft failure may include a change in vibration of the bearings measured by the accelerometer sensor.

According to another aspect of the present disclosure, an aircraft may include an internal combustion engine, an electrical power system including a permanent magnet machine and an inverter coupled to the permanent magnet machine, and a shaft. The permanent magnet machine may include a stator and a rotor configured to rotate relative to the stator to move a plurality of permanent magnets past a plurality of coils. The shaft may be coupled to the rotor of the permanent magnet machine to carry rotation from the internal combustion engine to the permanent magnet machine to drive rotation of the rotor. The aircraft may further include means for causing shaft failure in response to indicators of a fault in the permanent magnet machine so that the rotor of the permanent magnet machine is mechanically decoupled from the internal combustion engine and stops rotation thereby avoiding generation of undesired power profiles and/or excess heat.

In some embodiments, the shaft may include an input portion, an output portion, and shaft retention means for supporting the input and the output portions of the shaft upon induced shaft failure so that the input portion and the output portion are allowed to rotate relative to one another after the shaft failure. The input portion may be coupled to the internal combustion engine. The output portion may be coupled to the permanent magnet machine.

In some embodiments, the shaft retention means may include a plurality of bearings and a sleeve. The plurality of bearings may be spaced apart relative to each other along the shaft to support the input portion and the output portion of the shaft. The sleeve may be arranged around the plurality of bearings and the shaft to contain any loose shaft pieces after shaft failure.

In some embodiments, the shaft retention means may include a retainer ring. The retainer ring may have an input end arranged around the input portion of the shaft and an output end arranged around the output portion of the shaft to maintain non-rotational coupling of the input portion with the output portion. One of the input end and the output end of the retainer ring may be fixed to one of the input portion and the output portion of the shaft to couple the retainer ring for rotation therewith. The other of the input end and the output end may be free to rotate relative to the other of the input portion and the output portion of the shaft.

In some embodiments, the shaft retention means may include a tie bolt. The tie bolt may be arranged to extend through the shaft to maintain non-rotational coupling of the input portion with the output portion.

In some embodiments, the shaft retention means may include a controller coupled to the inverter. The controller may be configured to direct the inverter to induce a preselected torque transient in the shaft to excite the shaft at the predetermined failure frequency to selectively cause shaft failure in response to indicators of a fault in the permanent magnet machine. The controller may be configured to receive a signal indicative of a fault condition in the permanent magnet machine and to direct the inverter to induce shaft failure in response to receiving the signal indicative of the fault condition in the permanent magnet machine.

In some embodiments, the controller may be configured to receive a signal indicative of shaft failure after the inverter is directed to induce shaft failure to confirm the shaft has fractured in response to the preselected torque transient from the inverter. The controller may be configured to direct the inverter to operate the permanent magnet machine to in a motor-disabled mode in response to receiving the signal indicative of shaft failure.

These and other features of the present disclosure will become more apparent from the following description of the illustrative embodiments.

DETAILED DESCRIPTION OF THE DRAWINGS

Figure 1:
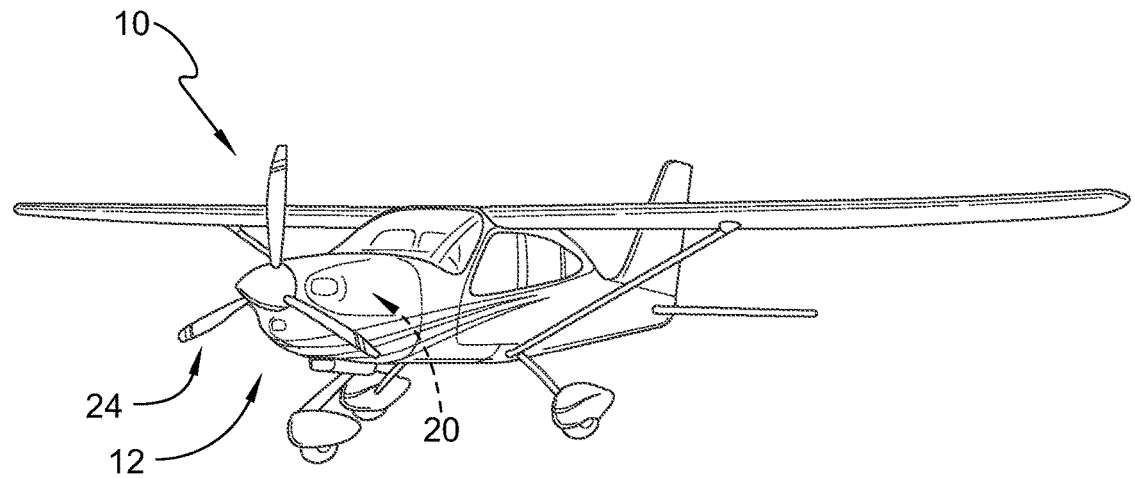
FIG. 1 is a perspective view of a hybrid aircraft including a propeller adapted to be driven by an internal combustion engine and/or by an electrical power system with electric motor-generator as suggested in the diagrammatic view of the aircraft drivetrain shown in FIG. 2.

For the purposes of promoting an understanding of the principles of the disclosure, reference will now be made to a number of illustrative embodiments illustrated in the drawings and specific language will be used to describe the same.

Figure 2:
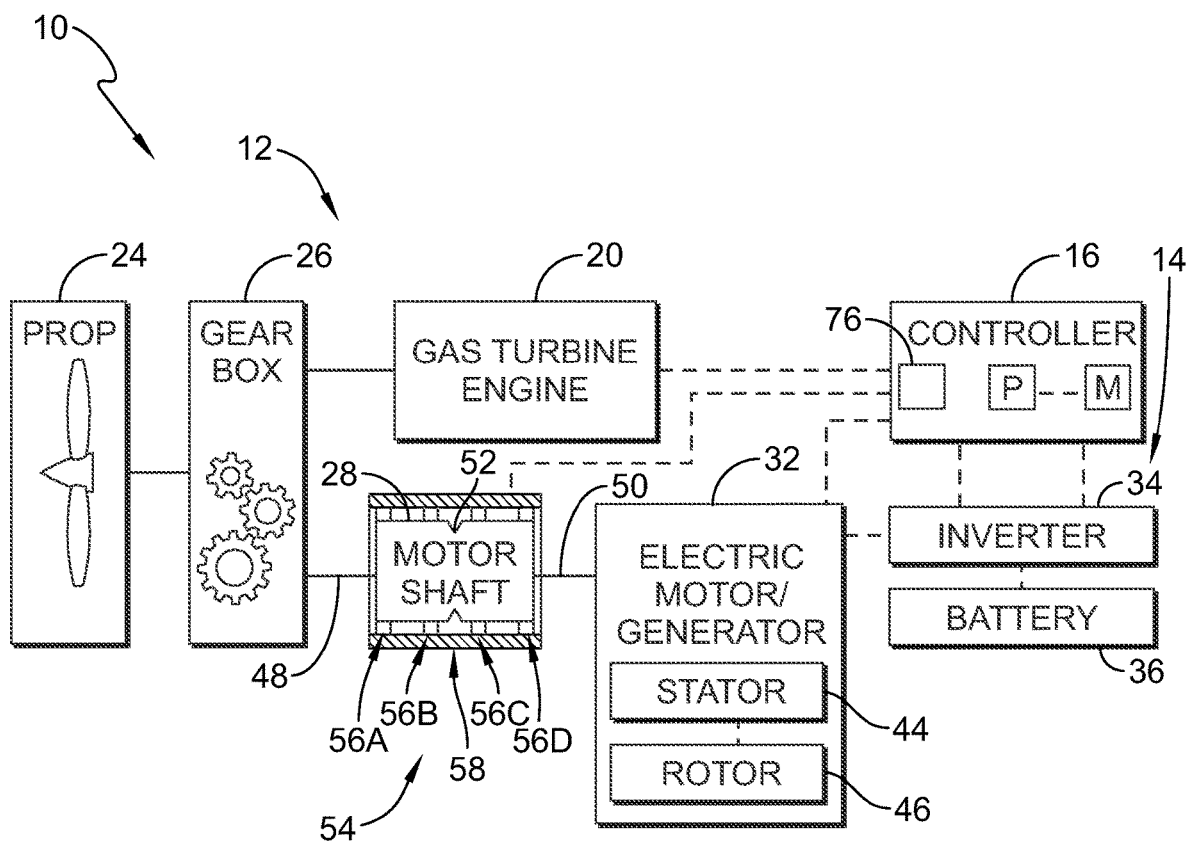
FIG. 2 is a diagrammatic view of the drivetrain of the hybrid aircraft in FIG. 1 showing that the drivetrain includes an output assembly, made up of the propeller and a gearbox; a gas turbine engine; the electrical power system, made up of the electric motor-generator along with an inverter and battery; a shaft coupled to the electric motor-generator to carry rotation from the gas turbine engine to the electric motor-generator; and a controller configured to direct operation of the inverter to induce a preselected torque transient in the shaft and thereby selectively cause shaft failure in response to indications of a fault in the electric motor-generator so that a rotor of the electric motor-generator stops avoids generation of undesired power profiles and/or excess heat.
Figure 7:
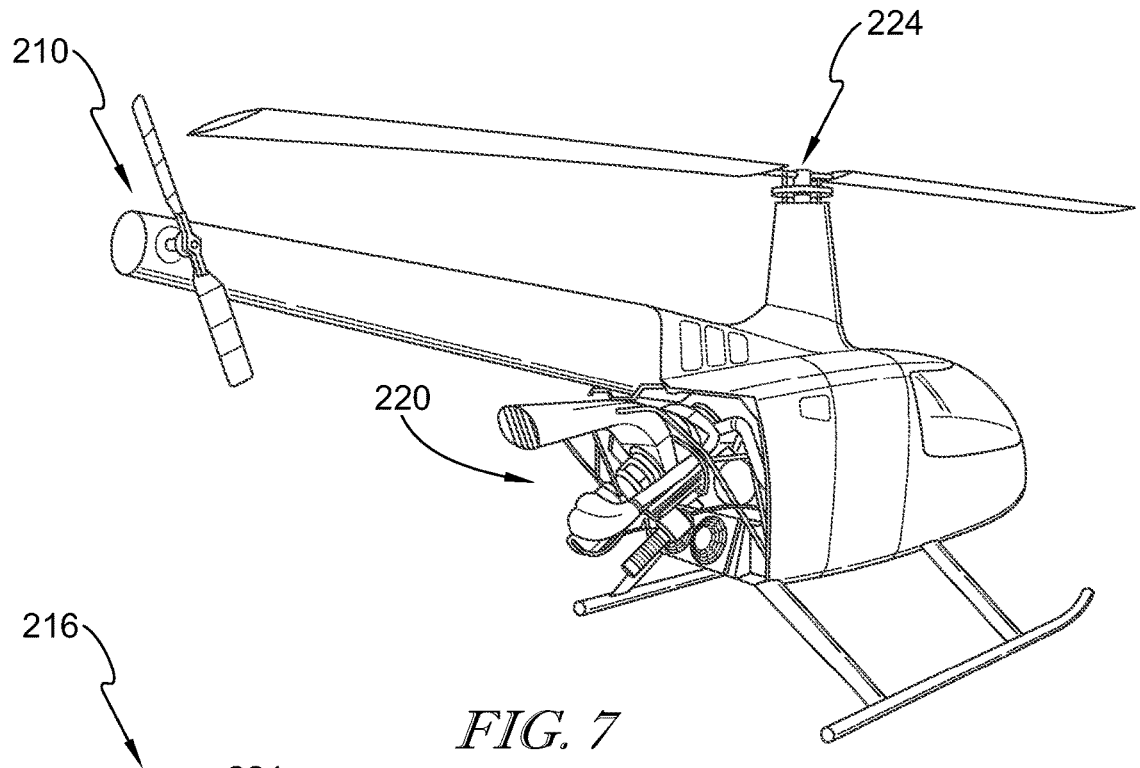
FIG. 7 is a perspective view of an aircraft including a propeller adapted to be driven by an internal combustion engine with a starter-generator motor as suggested in the diagrammatic view of the drivetrain in FIG. 8.
Figure 8:
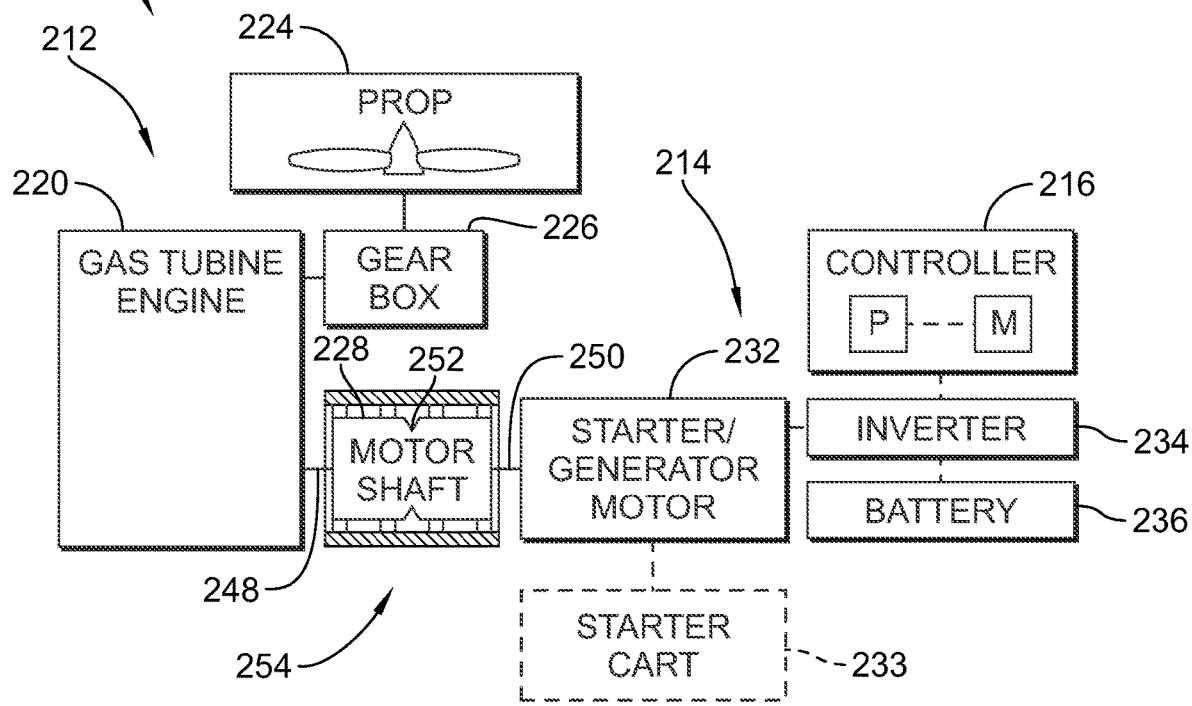
FIG. 8 is a diagrammatic view of the drivetrain of the aircraft in FIG. 6 showing that the drivetrain includes a shaft coupled to the electric motor-generator to carry rotation from the gas turbine engine to the starter-generator motor, and a controller configured to induce a preselected torque transient in the shaft to selectively cause shaft failure in response to indications of a fault in the generator of the starter-generator motor so that a rotor of the starter-generator motor stops thereby avoiding generation of undesired power profiles and/or excess heat.
Figure 9:
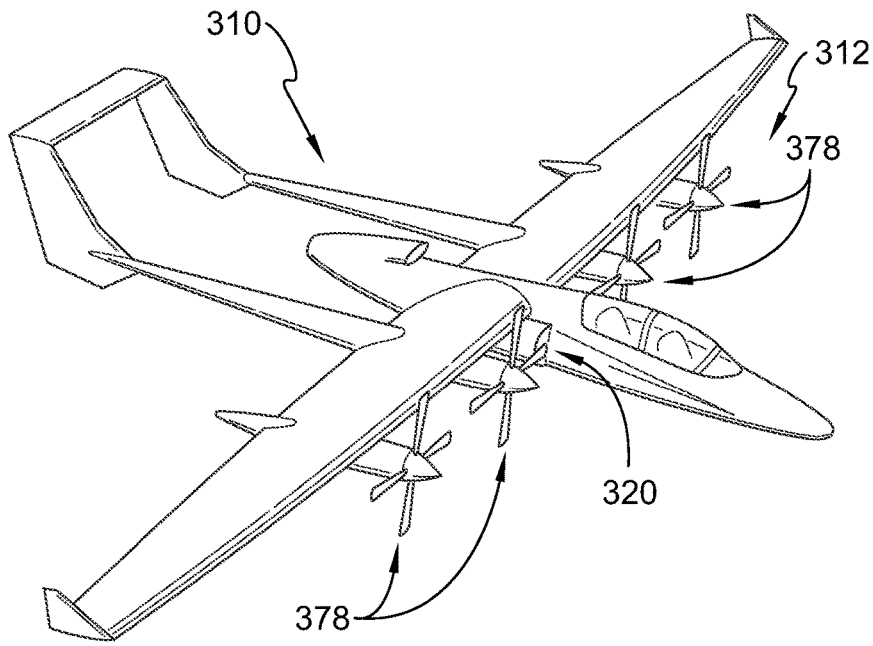
FIG. 9 is a perspective view of an aircraft with an electrified drivetrain having a gas turbine engine for power generation via onboard generators as suggested in the diagrammatic view of the drivetrain in FIG. 10.
Figure 10:
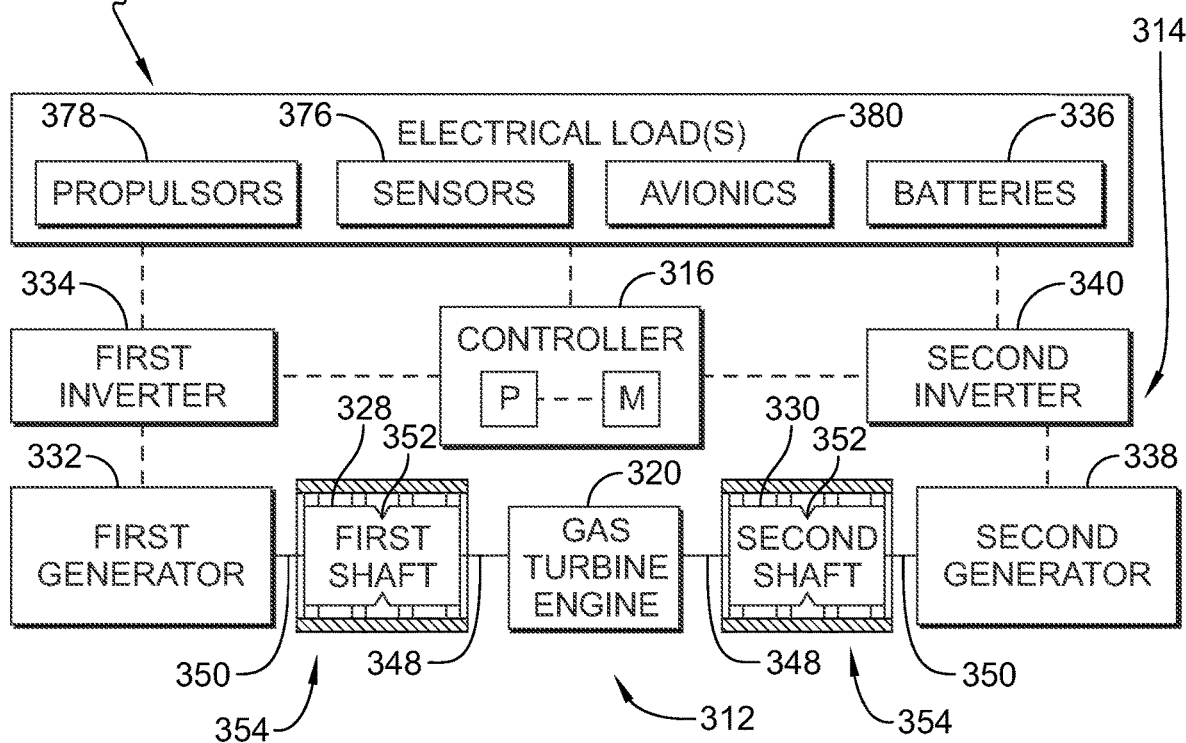
FIG. 10 is a diagrammatic view of the drivetrain of the aircraft in FIG. 9 showing that the drivetrain includes shafts coupled to the electric generators to carry rotation from the gas turbine engine to the electric generators, and a controller configured to induce a preselected torque transient in one or both of the shafts to selectively cause shaft failure in response to indications of a fault in one or more of the generators so that a rotor of the associated generator stops, thereby avoiding generation of undesired power profiles and/or excess heat.

A first embodiment of an electrified aircraft 10, like a hybrid aircraft, is shown in FIGS. 1 and 2. A second embodiment of an electrified aircraft 210, like a helicopter, is shown in FIGS. 7 and 8. A third embodiment of electrified aircraft 310 is shown in FIGS. 9 and 10.

The hybrid aircraft 10 includes a drivetrain 12 and an electric power system 14 as shown in FIGS. 1-5. The drivetrain 12 includes a gas turbine engine 20, an output system 22 made up of a propeller 24 and a gearbox 26, and shaft 28. The shaft 28 couples the gas turbine engine 20 to a permanent magnet machine 32 included in the electric power system 14. The electrical power system 14 includes the permanent magnet machine 32, an inverter 34, and a battery 36 coupled to the inverter 34.

The permanent magnet machine 32 includes a stator 44 and a rotor 46 as shown in FIG. 2. The rotor 46 is configured to rotate relative to the stator 44 to move a plurality of permanent magnets past a plurality of coils. The shaft 28 is coupled to the rotor 44 of the permanent magnet machine 32 to carry rotation from the gas turbine engine 20 to the permanent magnet machine 32 to drive rotation of the rotor 44.

In the illustrative embodiment, the permanent magnet machine 32 is an electric motor-generator. Permanent magnet machines, like the electric motor-generator shown, continue to create a moving magnetic field as long as the machine is rotating. In the event of a short circuit in the stator windings or other fault, the system can produce undesirable power profiles and/or overheating.

Therefore, the aircraft 10 further includes means for causing shaft failure in the shaft 28 in response to indicators of a fault in the permanent magnet machine 32. In this way, the rotor 44 of the permanent magnet machine 32 is mechanically decoupled from the gas turbine engine 10 and stops rotation thereby avoiding generation of undesired power profiles and/or excess heat.

In the illustrative embodiment, the means for causing shaft failure is a controller 16 included in the aircraft 10 that is coupled to the inverter. The controller 16 is configured to direct the inverter 34 to induce a preselected torque transient in the shaft 28 to excite the shaft 28 at a predetermined failure frequency to selectively cause shaft failure in response to indicators of a fault in the permanent magnet machine 32.

In order to break the shaft 28 by torsional excitation, the shaft 28 can have a failure frequency well above the normal operating frequencies of the shaft 28 and a way to retain the shaft 28 post shaft failure to prevent the shaft from damaging adjacent components. It is also possible to design the shaft to have a failure frequency in or around the normal operating frequencies with the controller 16 configured to minimize or avoid operation within the failure frequency range except during intentional breaking of the shaft 28. There are several ways to tune the failure frequency of the shaft 28.

For instance, the inner diameter, outer diameter, or the length of the shaft 28 may be altered. However, the inner diameter, outer diameter, and the length of the shaft 28 are often constrained by the design space claim. Therefore, the ability to alter the inner diameter, outer diameter, or the length of the shaft 28 may be limited.

Another way to tune the failure frequency of the shaft 28 is to use alternative materials. Stiffer materials will increase the failure frequency, while less stiff materials will decrease the failure frequency. Alternatively, composites may also be used to tune this behavior. For example, in a fiber matrix composite, fibers may be re-directed to "tune" the torsional stiffness of the shafting without altering the overall geometry or weight.

Another way to tune the failure frequency of the shaft 28 may be to change the mass of the shaft 28. More mass decreases the failure frequency and less mass increases the failure frequency. Alternatively, the shaft 28 may be dampened using o-rings or squeeze film dampers. Damping the shaft 28 may increase the failure frequency of shaft 28.

Figure 4:
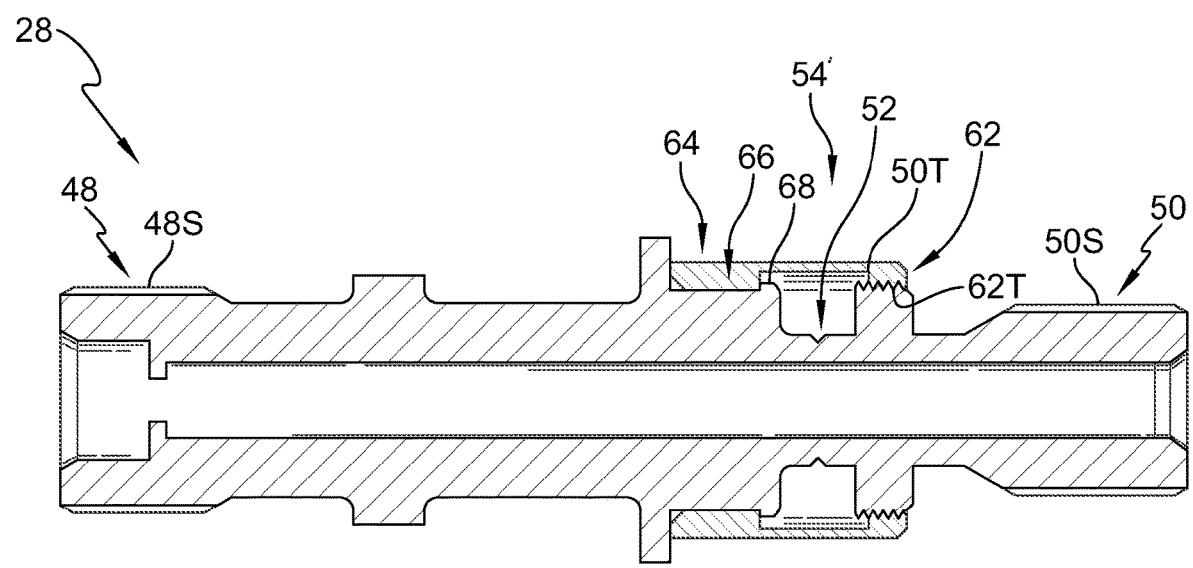
FIG. 4 is a cross-sectional view of the shaft of FIG. 3 showing the retainer ring has an input end arranged around the input portion of the shaft which is free to rotate relative to the input portion and an output end arranged around the output portion of the shaft which has threads that mate with threads formed on the output portion of the shaft to couple the retainer ring for rotation therewith.

It may also be important to predetermine where the shaft failure will occur on the shaft 28. Therefore, the shaft 28 is formed to include a preselected fracture feature 52 as shown in FIG. 4. The preselected fracture feature 52 is configured to fracture at the predetermined failure frequency in response to the preselected torque transient from the inverter 34. In the illustrative embodiment, a narrow neck or a notch provides the preselected fracture feature 52 as shown in FIG. 4.

Figure 3:
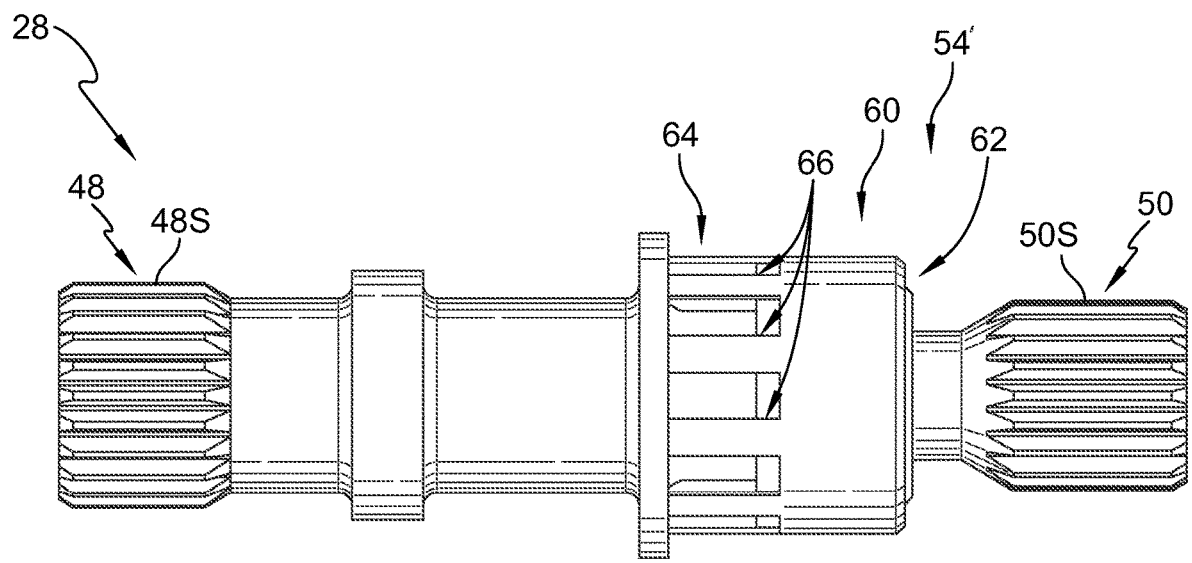
FIG. 3 is a side elevation view of an exemplary shaft adapted to be included in the drivetrain in FIG. 2 showing the shaft has an input portion forming input splines, an output portion forming output splines, and a shaft retainer ring coupled to the input portion and the output portion to support the input and the output portions of the shaft upon induced shaft failure so that the input portion and the output portion are allowed to rotate relative to one another after the shaft failure.

The shaft 28 is formed to include an input portion 48 coupled to the gearbox 26, an output portion 50 coupled to the permanent magnet machine 32, and the preselected fracture feature 52 as shown in FIGS. 3 and 4. The input portion 48 forms input splines 48S and the output portion 50 forms output splines 50S. The preselected fracture feature 52 is located between the input portion 48 and the output portion 50 of the shaft 28. The preselected fracture feature 52 is configured to fracture at the predetermined failure frequency in response to the preselected torque transient from the inverter 34 to mechanically decouple the permanent magnet machine 32 from the internal combustion engine 20.

To retain the shaft 28 after the shaft failure, the shaft 28 includes shaft retention means for supporting the input and the output portions 48, 50 of the shaft 28 upon induced shaft failure so that the input portion 48 and the output portion 50 are allowed to rotate relative to one another after the shaft failure. In this way, the shaft retention means maintains non-rotational coupling of the input portion 48 with the output portion 50 upon induced shaft failure at the preselected fracture feature 52. In the illustrative embodiment the shaft retention means is provided by a shaft retention assembly 54.

In one embodiment, the shaft retention assembly 54 includes a plurality of bearings 56A-D and a sleeve 58 as suggested in FIG. 2. The plurality of bearings 56A-D are spaced apart relative to each other along the shaft 28. The bearings 56A-D support the input and output portions 48, 50, while allowing the different portions to rotate at different speeds. In the illustrative embodiment, two bearings 56A, 56B are coupled to the input portion 48 and two bearings 56C, 56D are coupled to the output portion 50.

The sleeve 58 is arranged around the bearings 56A-D and the shaft 28 as shown in FIG. 2. The sleeve is arranged around the bearings 56A-D and the shaft 28 to contain any loose shaft pieces after shaft failure.

In another embodiment of the shaft retention assembly 54', the shaft retention assembly 54' instead, or additionally, includes a retainer ring 60 as shown in FIGS. 3 and 4. The retainer ring 60 is arranged around the preselected fracture feature 52 included in the shaft 28 to maintain non-rotational coupling of the input portion 48 with the output portion 50 upon induced shaft failure at the preselected fracture feature 52.

The retainer ring 60 is formed to include an output end 62 and an input end 64 as shown in FIGS. 3 and 4. The output end 62 is arranged around the output portion 50 of the shaft 28, while the input end 64 is arranged around the input portion 48 of the shaft 28.

One of the input end 64 and the output end 62 of the retainer ring 60 is fixed to one of the input portion 48 and the output portion 50 of the shaft 28 to couple the retainer ring 60 for rotation therewith. The other end 62, 64 is free to rotate relative to the other of the input portion 48 and the output portion 50 of the shaft 28.

In the illustrative embodiment, the output end 62 of the retainer ring 60 is the fixed end and the input end 64 is the free end. However, in other embodiments, the input end 64 of the retainer ring 60 is fixed to the input portion 48 of the shaft 28 and the output portion 62 is free.

In the illustrative embodiment, the output end 62 is formed to include threads 62T that mate with threads 50T formed on the output portion 50 of the shaft 28 to couple the retainer ring 60 for rotation therewith. The input end 64 is formed to include axially-extending fingers 66 with radially-inwardly extending lugs that engage a shoulder 68 on the input portion 48 to retain the input portion 48 to the output portion 50 upon shaft failure, but is free to rotate relative to the input portion 48 of the shaft 28.

In other embodiments, the output end 62 may be fixed to the output portion 50 of the shaft 28 using another suitable method. For example, the output end 62 of the retainer ring 60 may be welded to the output portion 50 of the shaft 28.

Figure 5:
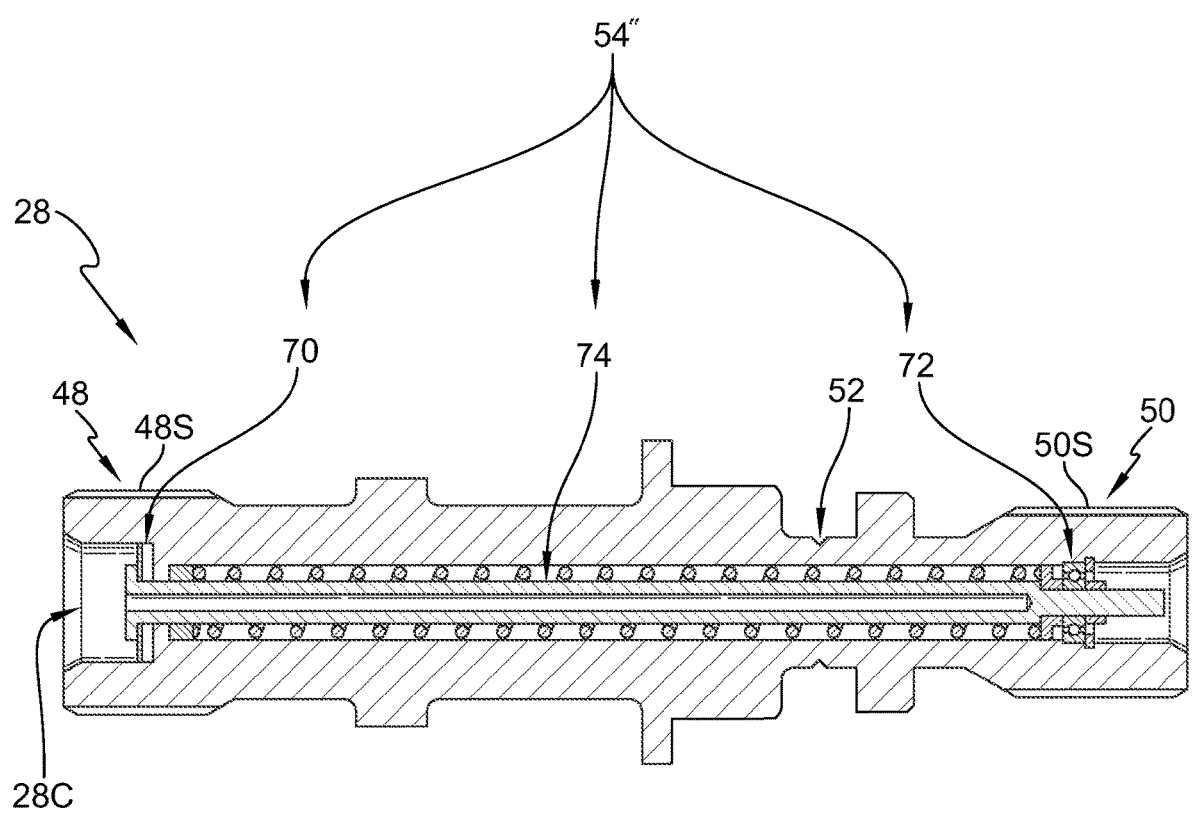
FIG. 5 is a cross-sectional view of another exemplary shaft adapted to be included in the drivetrain of FIG. 2 showing that a tie bolt for shaft retention arranged in the shaft to maintain non-rotational coupling of the input portion with the output portion upon induced shaft failure at a narrow neck.

In another embodiment of the shaft retention assembly 54", the shaft retention assembly 54" instead includes a first bearing 70, a second bearing 72, and a tie bolt 74 as shown in FIG. 5. The first bearing 70 is located in a hollow core 28C of the shaft 28 at the input portion 48 of the shaft 28. The second bearing 72 is located in a hollow core 28C of the shaft 28 at the output portion 50 of the shaft 28. The tie bolt 74 is arranged to extend between the first and second bearings 70, 72 in the hollow core 28C 28C that extends through the shaft 28. After shaft failure, the tie bolt 74 supports the input and output portions 48, 50 of the shaft 28 to maintain non-rotational coupling of the input portion 48 with the output portion 50.

Turning again to the controller 16, the controller 16 is configured to direct the inverter 34 to induce shaft failure in response to receiving a signal indicative of the fault condition in the permanent magnet machine 32. The permanent magnet machine fault condition may include a turn to turn fault, a phase to phase fault, or a phase to ground fault.

To trigger the shaft failure, the inverter 34 switches the power to phase A, B and C at the frequency of mechanical failure as previously provided to the inverter 34. It is probably sufficient to provide a 3 phase square wave at this frequency, but better performance may be achieved if the inverter 34 discriminates the fault and changes its waveform. If there is a phase-phase fault (ex. B-C), the inverter 34 may apply a two phase square wave. For example, the inverter 34 may apply the positive rail to phase A and negative to phases B and C, then switching from positive to negative on phase A at the same time as switching from negative to positive on phases B and C simultaneously.

If there is a hard phase-ground fault instead, say on phase C, the inverter 34 may open-circuit phase C and do two-phase switching on phase A and phase B instead. Similarly, a two-phase operation on the two healthy phases may be used on a turn-turn fault, to limit the current through the fault and reduce fire risk while the shaft 28 is being broken.

The controller 16 is configured operate the electrical power system 14 in a normal-operation mode before the shaft failure and a motor-disabled mode after the shaft failure in response to the fault condition in the permanent magnet machine 32. In the normal-operation mode, the permanent magnet machine 32 and the inverter 34 operate normally to generate electrical energy and use the energy to operate other electrical components included in the electric power system 14 of the aircraft 10 or store the energy on the battery 36 included in the electric power system 14. In the motor-disabled mode, the inverter 34 will stop switching and let the permanent magnet machine 32 coast to a stop. In other embodiments, the inverter 34 may short all three phases if a more rapid stop is needed.

The controller 16 is also configured to receive a signal indicative of shaft failure after the inverter 34 is directed to induce shaft failure. The controller 16 is configured to receive the signal indicative of shaft failure to confirm the shaft 28 has fractured in response to the preselected torque transient from the inverter 34. In response to receiving the signal indicative of shaft failure, the controller 16 is configured to direct the inverter 34 to operate the permanent magnet machine 32 to in the motor-disabled mode.

The controller 16 can include sensors 76 configured to provide feedback to the controller 16. In some embodiments, the sensors 76 include an accelerometer sensor 76 coupled to bearings that support the shaft 28. The accelerometer sensor 76 is configured to measure vibration of the bearings that support the shaft 28. The signal indicative of shaft failure includes a change in vibration of the bearings measured by the accelerometer sensor 76.

In some embodiments, the sensors 76 can include an angle sensor 76. The angle sensor 76 is coupled to the machine 32 to measure the position and speed of the shaft 28. In some embodiments, the sensors 76 include a leakage flux sensor 76. In some embodiments, the controller 16 receives signals indicative of shaft failure from other electrical components in the system.

Figure 6:
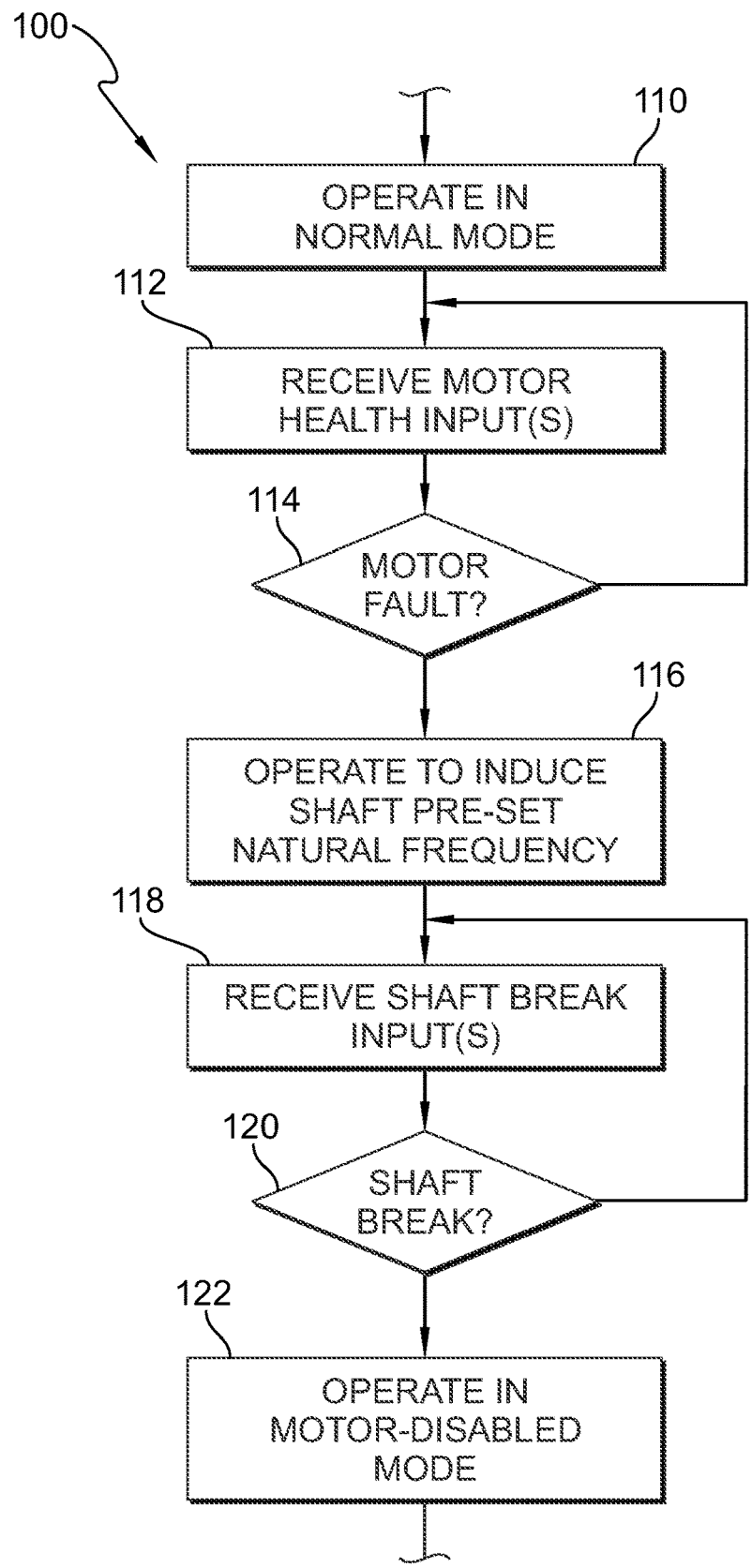
FIG. 6 is a flow chart showing a method of operating the controller drive train in FIGS. 1 and 2 showing that the controller is configured to induce shaft failure in response to detection of an electric motor-generator fault condition.

A method 100 of operating the electrical power system 14 may include several steps as shown in FIG. 6. The method 100 begins with operating the permanent magnet machine 32 in the normal operating mode as suggested by box 110. During the normal operating mode, the controller 16 receives health inputs from the permanent magnet machine 32 as suggested by box 112.

The controller 16 may receive health inputs from the sensors 76 or other electronic components that are indicative of the fault condition. If the controller 16 receives the signal indicative of the fault condition in the permanent magnet machine 32, the controller 16 directs the inverter 34 to induce shaft failure. To induce shaft failure, the inverter 34 operates so as to excite the shaft 28 to its predetermined failure frequency as suggested by box 116.

The inverter 34 is configured to excite the predetermined failure frequency of the shaft 28 only when directed by the controller 16, despite the type of fault condition that triggered it. The fault condition may be any one of a turn to a turn to turn fault in a single phase, a phase to phase fault, or a phase to ground fault in the permanent magnet machine 32. Any of these may create rapid heating in the permanent magnet machine 32, but may also leave the inverter 34 connected to the machine 32.

If a turn to turn fault occurred, the inverter 34 may still pass current normally to all three phases like in the normal-operation mode, but if normal-operation continues the permanent magnet machine 32 may overheat due to the fault. Therefore, once the controller 16 receives the signal indicative of the fault condition, the inverter 34 is configured to adjust its switching pattern to inject the torque ripple frequency to fail the shaft 28.

Mathematically the required frequency component may be added into the modulation signal before generating the required ripple component. In some embodiments, the resonance frequency term's magnitude is started at a small value and increased to a pre-determined maximum value. If the shaft 28 is still not broken, i.e. the controller 16 fails to receive the signal indicative of shaft failure from one of the sensors 76, the controller 16 may direct the inverter 34 to change the resonance frequency itself slowly from predetermined minimum value to a maximum value to enable shaft failure. This may be done because the actual shaft 28 may have a resonance frequency slightly different than predicted.

If a phase to phase fault occurs, the inverter 34 may still apply the torque ripple frequency by switching the shorted phases simultaneously at the torque ripple frequency, and switching the other third phase at the same frequency but 180 degrees out of phase. This should rattle the machine 32 at the required torque ripple frequency regardless of rotational speed. If the shaft 28 remains intact, the controller 16 may direct the inverter 34 to adjust the frequency as mentioned above to hone in on the resonance frequency, moving slowly to ensure sufficient dwell time for breakage at the correct value.

After the controller 16 directs the inverter 34 to induce shaft failure, the sensors 76 provide feedback to the controller 16 to confirm the shaft 28 has fractured as suggested by box 120. If the controller 16 receives the signal indicative of shaft failure from one of the sensors 76, the controller 16 is configured to direct the electric power system 14 to operate in the motor-disabled mode as suggested by box 122. The electric power system 14 is operated in the motor-disabled mode indefinitely until the aircraft 10 can be looked at for repairs.

Another embodiment of an aircraft 210 in accordance with the present disclosure is shown in FIGS. 7 and 8. The aircraft 210 is substantially similar to the aircraft 10 shown in FIGS. 1-6 and described herein. Accordingly, similar reference numbers in the 200 series indicate features that are common between the aircraft 10 and the aircraft 210. The description of the aircraft 10 is incorporated by reference to apply to the aircraft 210, except in instances when it conflicts with the specific description and the drawings of the aircraft 210.

The aircraft 210, or helicopter 210, includes a drivetrain 212, an electric power system 214, and a controller 216 as shown in FIGS. 7 and 8. The drivetrain 212 includes a gas turbine engine 220, an output system 222 made up of a propeller 224 and a gearbox 226 coupled to the propeller 224, and shaft 228. The shaft 228 couples the gas turbine engine 220 to a permanent magnet machine 232 included in the electric power system 214. The electrical power system 214 includes the permanent magnet machine 232, an inverter 234 coupled to the permanent magnet machine 232, and a battery 236 coupled to the inverter 238. The controller 216 is coupled to the component in the electric power system 214 to control the electric power system 214.

In the illustrative embodiment, the permanent magnet machine 232 is a starter generator-motor as shown in FIG. 8. The starter generator-motor 232 includes a stator and a rotor (not shown). The shaft 230 is coupled to the rotor of the starter generator-motor 232 to carry rotation from the gas turbine engine 220 to the starter generator-motor 232 to drive rotation of the rotor.

Each of the shafts 228, 230 is formed to include an input portion 248 coupled to the gas turbine engine 220, an output portion 250 coupled to the corresponding generator 232, 238, and a shaft retention assembly 254 coupled to the input portion 248 and the output portion 250 as shown in FIG. 8. Each shaft 228, 230 is also formed to include a preselected fracture feature 252 located between the input portion 248 and the output portion 250 of the respective shaft 228, 230 as shown in FIG. 8.

In some embodiments, the aircraft 10 may include a starter cart 233 as shown in FIG. 8. The starter cart 233 is coupled to the starter generator-motor 232.

Another embodiment of an aircraft 310 in accordance with the present disclosure is shown in FIGS. 9 and 10. The aircraft 310 is substantially similar to the aircraft 10 shown in FIGS. 1-6 and described herein. Accordingly, similar reference numbers in the 300 series indicate features that are common between the aircraft 10 and the aircraft 310. The description of the aircraft 10 is incorporated by reference to apply to the aircraft 310, except in instances when it conflicts with the specific description and the drawings of the aircraft 310.

The aircraft 310 includes a drivetrain 312, an electric power system 314, and a controller 316 as shown in FIGS. 7 and 8. The drivetrain 312 includes a gas turbine engine 320, a gearbox 326 coupled to the gas turbine engine 320, and shafts 328, 330. Each of the shafts 328, 330 couples the gas turbine engine 320 to a generator 332, 338 included in the electric power system 314. The electrical power system 314 includes first and second generators 332, 338, first and second inverters 334, 340 coupled to the respective generator 332, 338, and electrical loads 342. The electrical loads 342 include batteries 336, sensors 376, propulsors 378, and avionics 380.

The first shaft 328 couples the gas turbine engine 320 to the first generator 332 and the second shaft 330 couples the gas turbine engine 320 to the second generator 338. The gas turbine engine 320 drives the generators 332, 338 to generate electrical power. The electrical power generated is used to power the electrical loads 34.

Each of the shafts 328, 330 is formed to include an input portion 348 coupled to the gas turbine engine 320, an output portion 350 coupled to the corresponding generator 332, 338, and a shaft retention assembly 354 coupled to the input portion 348 and the output portion 350. The shaft retention assembly 354 supports the input and the output portions 348, 350 of the corresponding shaft 328, 330 upon induced shaft failure so that the input portion 348 and the output portion 350 are allowed to rotate relative to one another after the shaft failure.

In the illustrative embodiment, the shaft retention assembly 354 is the same as the shaft retention assembly 54 shown in FIG. 2. In other embodiments, the shaft retention assembly 354 may be like the embodiments shown in FIG. 4 or in FIG. 5.

Each shaft 328, 330 is also formed to include a preselected fracture feature 352 located between the input portion 348 and the output portion 350 of the respective shaft 328, 330 as shown in FIG. 10. The preselected fracture feature 352 is configured to fracture at the predetermined failure frequency in response to the preselected torque transient from the respective inverter 334, 340 to mechanically decouple the respective generator 332, 338 from the gas turbine engine 320.

The controller 316 is configured operate the electrical power system 314 in a normal-operation mode before the shaft failure and a motor-disabled mode after the shaft failure. The controller 316 is configured to selectively direct the inverters 334, 340 to induce shaft failure in response to receiving a signal indicative of the fault condition in the respective generator 332, 338. If one of the generators 332, 338 has a fault condition, the controller 316 directs the corresponding inverter 334, 340 to induce shaft failure in the corresponding shaft 328, 330.

The controller 16 is also configured to receive a signal indicative of shaft failure after the inverter 34 is directed to induce shaft failure. The controller 16 is configured to receive the signal indicative of shaft failure to confirm the shaft 28 has fractured in response to the preselected torque transient from the inverter 34. In response to receiving the signal indicative of shaft failure, the controller 16 is configured to direct the inverter 34 to operate the permanent magnet machine 32 to in the motor-disabled mode.

Electric machines, such as motor or generators, in weight/size sensitive applications like aerospace applications (i.e. engine-driven generators and propeller driving motors) may use permanent magnet based machines rather than inductions, wound field, switched reluctance, or other architectures. These permanent magnets cannot be switched off, and will continue to create a moving magnetic field as long as the machine is turning, even if there is a short circuit in the stator windings causing overheating.

This may cause a problem and create a case for heavier fault-tolerant machines, or the addition of heavy brakes or clutches in the shafting to handle the failure if the machine is driven by an engine that cannot be shutdown during flight, or to a propeller which cannot stop wind milling. Potential failures may include phase-phase, phase-ground, and turn to turn faults in the machine's windings, and phase-phase and phase/ground in the power conductors or the power converter (inverter or rectifier) that the machine is connected to. Only some of these faults could be handled by open-circuiting the faulted circuit with a reasonable number of fuses or contactors.

The present disclosure relates to a system 10, 210, 310 with a fault isolation technique using the attached power converter 34, 234, 334, 340 to introduce torque transients on the shaft 28, using the remaining circuits in the motor/converter after the fault, to cause failure of the driveshaft 28, 228, 328, 330 out of the motor/into the generator. This allows the machine 32, 232, 332 to stop rotating without having the extra weight of a clutch system or brake.

The shaft 28, 228, 328, 330 is configured to perform all of its required functions during normal and abnormal operation, steady state and transient, but also has a known weakness, i.e. a torsional natural frequency above normal stimulating frequency but within the capacity of the inverter's switches. The inverter and its software are programmed to apply an exciting current to the remaining motor circuits at this resonant frequency when a shaft break is desired.

In order to break the shaft 28, 228, 328, 330 based on a torsional excitation, the natural torsional frequencies of the shaft 28, 228, 328, 330 need to be understood. This can be simply calculated for a shaft by the following equation:

$$w_n = a_n * \sqrt{\frac{EI}{\mu l^4}}$$

where $w_n$ is the natural frequency of torsional vibration (rad/s), also known as "critical speed," $a_n$ is a constant representative of the support scheme in the shafting (cantilevered, simply supported, offset mass, etc) and which mode shape is of interest, E is the modulus of elasticity in the material (Pa), I is the area moment of inertia (m⁴), μ is the mass per unit length (kg/m), and l is the shaft length between supports (m).

The critical speed can be converted from a calculated rotational speed to a frequency by the following relationship:

$$f_n = \frac{w_n}{2\pi}$$

where $f_n$ is the natural frequency.

In this example, we will assume a simply supported quill shaft with no damping effects from mass isolators, o-rings, squeeze film, etc anywhere along the support structure. Using sample data from the EPU Motor, the following can be calculated:

$E = 200e9 Pa$ (AMS 6414, @RT)

$I = 1.539e-8 m^4$

The example shafting used has a non-uniform cross section, of which the area moment of inertia will be considered as an average across the total length of the shaft, for this example.

$$\mu = \frac{0.542 \text{ kg}}{0.129 \text{ m}} = 4.202 \frac{\text{kg}}{\text{m}}$$

$l = 0.129$ m

Length taken from spline center-to-center is an=9.87, 39.5.

Once the natural frequencies of torsional vibration are well understood, then the inverter 34, 234, 334, 340 is used to excite the shaft 28, 228, 328, 330 at that frequency to induce high vibration in the shaft 28, 228, 328, 330 and subsequent failure of that component.

The shaft 28, 228, 328, 330 is configured so that normal operating excitations will not excite these shaft modes. Additionally, the attached torsional drives may need to be tuned so that the excitation frequency is sufficiently far away from the designed "failure frequency" so that the desired shaft 28, 228, 328, 330 may be isolated.

The critical frequency of the shaft 28, 228, 328, 330 may be tuned by altering the inner diameter, outer diameter, or the length of the shaft 28, 228, 328, 330. The dimensions of the shaft 28, 228, 328, 330 may be constrained by the design space claim.

The critical frequency of the shaft 28, 228, 328, 330 may be tuned by using alternative materials. Stiffer materials may increase the critical frequency, while less stiff materials may decrease the critical frequency. Using less stiff material should be cautioned as torque carrying capability and deflection may be a concern.

The critical frequency of the shaft 28, 228, 328, 330 may be tuned by using composites. For example, in a fiber matrix composite, fibers may be re-directed to "tune" the torsional stiffness of the shaft 28, 228, 328, 330 without altering the overall geometry or weight.

The critical frequency of the shaft 28, 228, 328, 330 may be tuned by changing the mass. More mass may decrease the critical frequency, while less mass may increase the critical frequency.

The critical frequency of the shaft 28, 228, 328, 330 may be tuned by damping the shaft 28, 228, 328, 330. The shaft 28, 228, 328, 330 may be dampened by using of o-rings, squeeze film dampers, etc that may increase the critical frequency of a selected shaft.

The critical frequency of the shaft 28, 228, 328, 330 may be tuned by using a centralized mass shaft design (similar to EPU Motor shafting), where a relatively large mass is placed central to the shaft. The equation become the following:

$$w_n = \sqrt{\frac{K}{M + 0.5m}}$$

where "K" is the torsional stiffness of the shaft $$\left( \sim \frac{48EI}{l^3} \right),$$

M is the centralized mass, and m is the mass of the shaft (excluding the centralized mass).

Post failure, the shaft 28, 228, 328, 330 may need to be contained to prevent the shaft 28, 228, 328, 330 from causing extensive damage to adjacent components. This may be managed by the shaft 28, 228, 328, 330 and supporting components, which can be designed to continually support both sides of the predicted failure location after failure. The shaft retention assembly 54, 54', 54" is configured to keep the two shaft pieces aligned and roughly in place as they spin at different speeds at least until the machine 32, 232, 332 stops rotating.

The inverter 34, 234, 334, 340 is configured to excite the desired failure frequency only when commanded, and despite whatever failure occasioned the command. The nominal failures where this may be desired are single point failures in the insulation of the machine, either a turn to turn short in a single phase, or a 2 phase short. These faults may create rapid heating in the motor, but leave the inverter connected to the machine.

If a turn to turn fault occurred, the inverter 34, 234, 334, 340, may still pass current normally to all three phases, but if it continues as normal, the motor may overheat due to the fault. In the system 10, 210, 310, the inverter 34, 234, 334, 340 may adjust its switching pattern to inject the torque ripple frequency to fail the shaft 28, 228, 328, 330. Mathematically the required frequency component may be added into the modulation signal before generating the required ripple component. In some embodiments, the resonance frequency term's magnitude may be started at a small value and increased to a pre-determined maximum value. If the shaft is still not broken (breakage detectable by sudden change in motor speed), the resonance frequency itself may be changed slowly from predetermined minimum value to a maximum value to enable shaft breaking, as the actual shaft may have a resonance frequency slightly different than predicted.

If a phase to phase fault occurs, the inverter 34, 234, 334, 340 may still apply the torque ripple frequency by switching B and C simultaneously at the torque ripple frequency, and switching A at the same frequency but 180 degrees out of phase. This should rattle the machine at the required torque ripple frequency regardless of rotational speed. If the shaft remains intact the frequency may be adjusted as mentioned above to hone in on the resonance frequency, moving slowly to ensure sufficient dwell time for breakage at the correct value.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electrified aircraft comprising
an internal combustion engine,
an electrical power system including a permanent magnet machine and an inverter coupled to the permanent magnet machine, the permanent magnet machine including a stator and a rotor configured to rotate relative to the stator to move a plurality of permanent magnets past a plurality of coils,
a shaft coupled to the rotor of the permanent magnet machine to carry rotation from the internal combustion engine to the permanent magnet machine to drive rotation of the rotor, the shaft having a predetermined failure frequency that is different from normal operating frequencies of the shaft, and
a controller coupled to the inverter and configured to direct the inverter to induce a preselected torque transient in the shaft to excite the shaft at the predetermined failure frequency to selectively cause shaft failure in response to indicators of a fault in the permanent magnet machine so that the rotor of the permanent magnet machine is mechanically decoupled from the internal combustion engine and stops rotation thereby avoiding generation of undesired power profiles and/or excess heat.

2. The aircraft of claim 1, wherein the shaft includes an input portion coupled to the internal combustion engine, an output portion coupled to the permanent magnet machine, and a shaft retention assembly coupled to the input portion and the output portion to support the input and the output portions of the shaft upon induced shaft failure so that the input portion and the output portion are allowed to rotate relative to one another after the shaft failure.

3. The aircraft of claim 2, wherein the shaft retention assembly includes plurality of bearings spaced apart relative to each other along the shaft to support the input portion and the output portion of the shaft and a sleeve arranged around the plurality of bearings and the shaft to contain any loose shaft pieces after shaft failure.

4. The aircraft of claim 2, wherein the shaft retention assembly includes a retainer ring having an input end arranged around the input portion of the shaft and an output end arranged around the output portion of the shaft to maintain non-rotational coupling of the input portion with the output portion.

5. The aircraft of claim 4, wherein one of the input end and the output end of the retainer ring is fixed to one of the input portion and the output portion of the shaft to couple the retainer ring for rotation therewith and the other of the input end and the output end is free to rotate relative to the other of the input portion and the output portion of the shaft.

6. The aircraft of claim 5, wherein the shaft further includes a narrow neck located between the input portion and the output portion of the shaft that provides a preselected fracture feature configured to fracture at the predetermined failure frequency in response to the preselected torque transient from the inverter to mechanically decouple the permanent magnet machine from the internal combustion engine, and wherein the retainer ring is arranged around the preselected fracture feature included in the shaft.

7. The aircraft of claim 2, wherein the shaft retention assembly includes a tie bolt arranged to extend through the shaft to maintain non-rotational coupling of the input portion with the output portion.

8. The aircraft of claim 1, wherein the controller is configured to receive a signal indicative of a fault condition in the permanent magnet machine and to direct the inverter to induce shaft failure in response to receiving the signal indicative of the fault condition in the permanent magnet machine.

9. The aircraft of claim 8, wherein the fault condition in the permanent magnet machine includes at least one of a turn to turn fault, a phase to phase fault, and a phase to ground fault.

10. The aircraft of claim 8, wherein the controller is configured to receive a signal indicative of shaft failure after the inverter is directed to induce shaft failure to confirm the shaft has fractured in response to the preselected torque transient from the inverter.

11. The aircraft of claim 10, wherein the controller is configured to direct the inverter to operate the permanent magnet machine to in a motor-disabled mode in response to receiving the signal indicative of shaft failure.

12. The aircraft of claim 10, wherein the controller includes an accelerometer sensor coupled to bearings that support the shaft and configured to measure vibration of the bearings, and wherein the signal indicative of shaft failure includes a change in vibration of the bearings measured by the accelerometer sensor.

13. An aircraft comprising
an internal combustion engine,
an electrical power system including a permanent magnet machine and an inverter coupled to the permanent magnet machine, the permanent magnet machine including a stator and a rotor configured to rotate relative to the stator to move a plurality of permanent magnets past a plurality of coils,
a shaft coupled to the rotor of the permanent magnet machine to carry rotation from the internal combustion engine to the permanent magnet machine to drive rotation of the rotor, and
means for causing shaft failure in response to indicators of a fault in the permanent magnet machine so that the rotor of the permanent magnet machine is mechanically decoupled from the internal combustion engine and stops rotation thereby avoiding generation of undesired power profiles and/or excess heat,
wherein the means for causing shaft failure includes a controller coupled to the inverter, the controller is configured to direct the inverter to induce a preselected torque transient in the shaft to excite the shaft at a predetermined failure frequency to selectively cause shaft failure in response to the indictors of the fault in the permanent magnet machine.

14. The aircraft of claim 13, wherein the shaft includes an input portion coupled to the internal combustion engine, an output portion coupled to the permanent magnet machine, and shaft retention means for supporting the input and the output portions of the shaft upon induced shaft failure so that the input portion and the output portion are allowed to rotate relative to one another after the shaft failure.

15. The aircraft of claim 14, wherein the shaft retention means includes a plurality of bearings spaced apart relative to each other along the shaft to support the input portion and the output portion of the shaft and a sleeve arranged around the plurality of bearings and the shaft to contain any loose shaft pieces after shaft failure.

16. The aircraft of claim 14, wherein the shaft retention means includes a tie bolt arranged to extend through the shaft to maintain non-rotational coupling of the input portion with the output portion.

17. The aircraft of claim 13, wherein the controller is configured to receive a signal indicative of a fault condition in the permanent magnet machine and to direct the inverter to induce shaft failure in response to receiving the signal indicative of the fault condition in the permanent magnet machine.

18. The aircraft of claim 13, wherein the controller is configured to receive a signal indicative of shaft failure after the inverter is directed to induce shaft failure to confirm the shaft has fractured in response to the preselected torque transient from the inverter.

19. The aircraft of claim 18, wherein the controller is configured to direct the inverter to operate the permanent magnet machine to in a motor-disabled mode in response to receiving the signal indicative of shaft failure.

20. An aircraft comprising
an internal combustion engine,
an electrical power system including a permanent magnet machine and an inverter coupled to the permanent magnet machine, the permanent magnet machine including a stator and a rotor configured to rotate relative to the stator to move a plurality of permanent magnets past a plurality of coils,
a shaft coupled to the rotor of the permanent magnet machine to carry rotation from the internal combustion engine to the permanent magnet machine to drive rotation of the rotor, and
means for causing shaft failure in response to indicators of a fault in the permanent magnet machine so that the rotor of the permanent magnet machine is mechanically decoupled from the internal combustion engine and stops rotation thereby avoiding generation of undesired power profiles and/or excess heat,
wherein the shaft includes an input portion coupled to the internal combustion engine, an output portion coupled to the permanent magnet machine, and shaft retention means for supporting the input and the output portions of the shaft upon induced shaft failure so that the input portion and the output portion are allowed to rotate relative to one another after the shaft failure, and
wherein the shaft retention means includes a retainer ring having an input end arranged around the input portion of the shaft and an output end arranged around the output portion of the shaft to maintain non-rotational coupling of the input portion with the output portion, and wherein one of the input end and the output end of the retainer ring is fixed to one of the input portion and the output portion of the shaft to couple the retainer ring for rotation therewith and the other of the input end and the output end is free to rotate relative to the other of the input portion and the output portion of the shaft.

\* \* \* \* \*